United States Patent
Gupta et al.

(10) Patent No.: US 11,246,138 B2
(45) Date of Patent: *Feb. 8, 2022

(54) RESOURCE ALLOCATION IN CELLULAR NETWORKS

(71) Applicant: Nokia Solutions and Networks Oy, Espoo (FI)

(72) Inventors: Richa Gupta, Bangalore (IN); Suresh Kalyanasundaram, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 269 days.

This patent is subject to a terminal disclaimer.

(21) Appl. No.: 16/342,687

(22) PCT Filed: Apr. 12, 2017

(86) PCT No.: PCT/IB2017/000416
§ 371 (c)(1),
(2) Date: Apr. 17, 2019

(87) PCT Pub. No.: WO2018/073633
PCT Pub. Date: Apr. 26, 2018

(65) Prior Publication Data
US 2020/0053735 A1    Feb. 13, 2020

(30) Foreign Application Priority Data
Oct. 21, 2016   (IN) .............. 201611036116

(51) Int. Cl.
*H04W 72/04*       (2009.01)
*H04L 5/00*        (2006.01)
(Continued)

(52) U.S. Cl.
CPC ....... *H04W 72/0486* (2013.01); *H04L 5/0082* (2013.01); *H04W 72/04* (2013.01);
(Continued)

(58) Field of Classification Search
CPC ............ H04W 72/0486; H04W 72/04; H04W 72/042; H04W 88/14; H04W 28/0252; H04L 5/0082
See application file for complete search history.

(56) References Cited

U.S. PATENT DOCUMENTS 9,332,558 B2    5/2016  Pikhletsky et al.
2009/0059850 A1  3/2009  Jung et al.
(Continued)

FOREIGN PATENT DOCUMENTS

WO    2018/072905 A1    4/2018

OTHER PUBLICATIONS

International Search Report and Written Opinion received for corresponding Patent Cooperation Treaty Application No. PCT/IB2017/000416, dated Sep. 13, 2017, 9 pages.

*Primary Examiner* — Natasha W Cosme
(74) *Attorney, Agent, or Firm* — Squire Patton Boggs (US) LLP

(57) ABSTRACT

Methods and Systems are disclosed for allocating a time-frequency resource of a large cell base station either to a selected first user equipment associated with the base station, or to a selected self-backhaul link associated with a small cell within the coverage area of the large cell base station. In embodiments, data is provided representing target allocation proportions of the time-frequency resource, for each of the first user equipment(s) and the one or more backhaul link(s). Allocations are made, for each of a series of time units or intervals, either to a selected first user equipment or backhaul link based on the target data.

20 Claims, 12 Drawing Sheets

(51) Int. Cl.
*H04W 88/14* (2009.01)
*H04W 28/02* (2009.01)

(52) U.S. Cl.
CPC ......... *H04W 72/042* (2013.01); *H04W 88/14* (2013.01); *H04W 28/0252* (2013.01)

(56) References Cited

U.S. PATENT DOCUMENTS

| | | | |
|---|---|---|---|
| 2011/0292865 A1 | 12/2011 | Seo et al. | |
| 2015/0257024 A1* | 9/2015 | Baid | H04W 24/08 370/338 |
| 2016/0198475 A1* | 7/2016 | Uchiyama | H04B 17/11 370/329 |
| 2016/0269097 A1 | 9/2016 | Islam et al. | |

* cited by examiner

RESOURCE ALLOCATION IN CELLULAR NETWORKS

RELATED APPLICATION

This application was originally filed as PCT Application No. PCT/IB2017/000416 filed Apr. 12, 2017, which claims priority benefit from Indian Patent Application No. 201611036116, filed Oct. 21, 2016.

FIELD OF THE INVENTION

This invention relates to resource allocation in cellular networks, for example networks which comprise macro base stations and small cell base stations with self-backhauling.

BACKGROUND OF THE INVENTION

Future technologies for mobile communications propose higher bandwidths and spectrum efficiencies to handle increasing demand. The use of so-called small cells is considered an important part of future Long Term Evolution (LTE) and 5G mobile networks. Small cells are low-powered cellular access points that have a smaller range than conventional 'macro cell' base stations. A small cell is likely to have a range of approximately ten metres to a few kilometres. They are small compared to macro cells, partly because they have a shorter range and partly because they will typically handle fewer concurrent calls or sessions.

Large scale ad-hoc deployment of small cells is expected to improve coverage and spectrum reuse. This is especially the case in 5G higher bands due to the limited coverage of cm-wave and mm-wave bands, and the challenging propagation conditions in these bands. The need for high cost optical fibre, or similar wired connectivity for the backhaul links between the small and macro cells may be mitigated by using a radio access network (RAN) for the backhaul links. This so-called in-band self-backhauling allows the formation of cost-efficient and highly dense small cell networks by sharing the available radio spectrum between access and backhaul links.

For downlink transmission, the macro base station forwards data destined for small cell user equipment (UE) to the small cell for its own scheduling decision. Small cells with self-backhauling act as decode-and-forward relays.

SUMMARY OF THE INVENTION

A first aspect of the invention provides a method comprising: in a large cell base station of a cellular communication system, providing data representing target allocation proportions of a time-frequency resource of the large cell base station, for each of (i) one or more first user equipment(s) associated with the large cell base station, and (ii) one or more backhaul link(s) to respective small cell base station(s) within the coverage area of the large cell base station; and allocating the resource, for each of a series of time units or intervals, either to a selected first user equipment or backhaul link based on the target data.

The method may further comprise scheduling, in each time unit or interval, the transmission of data destined for the allocated first user equipment or backhaul link.

The method may further comprise determining current allocation proportions for each of the first user equipment(s) and the backhaul link(s), the allocating step being performed based on which of the current allocation proportions is the lowest in relation to its corresponding target.

The current allocation proportions may be updated, responsive to an allocation, for use in a subsequent time unit or interval.

The allocating step may comprise allocating the time-frequency resource to the selected first user equipment or backhaul link that satisfies:

$$\min_{\forall i \in M, \forall k \in S} \left( \frac{\rho i(t)}{\rho i^*}, \frac{\rho_k^{SC}(t)}{\rho_k^{SC*}} \right)$$

where M is the number of first user equipment(s) within the coverage area of the large cell base station, S is the number of small cell base station(s), $\rho i(t)$ is the current allocation proportion allocated to a first user equipment i, $\rho_k^{SC}(t)$ is the current allocation proportion allocated to a backhaul link for a small cell base station k, $\rho i^*$ is the target allocation proportion allocated to a first user equipment i, and $\rho_k^{SC*}$ is the target allocation proportion allocated to a backhaul link for small cell k.

In the event that the time frequency resource is allocated to a first user equipment, the method may further comprise transmitting a notification to small cell base station(s) to enable scheduling of one or more second user equipment(s) associated with said small cell base station(s).

Responsive to receiving a notification, the or each small cell base station may allocates its own time-frequency resource to a selected second user equipment based on target allocation proportions for each second user equipment.

The small cell base station may further determine current allocation proportions for each of the second user equipment(s) and allocates its own time-frequency resource to that which is lowest with respect to its corresponding target.

In the event that the time frequency resource is allocated to a backhaul link, the method may further comprise transmitting a notification to the associated small cell base station to prevent it transmitting data to second user equipment(s) within the same time unit or interval.

The notification may be transmitted on the backhaul link in a time unit or interval prior to the time unit or interval in which the data is to be transmitted on the backhaul link.

The notification may be transmitted on a control channel and the data is transmitted on a shared channel.

The notification may be transmitted on a PDCCH channel and the data is transmitted on a PDSCH channel.

The method may further comprise selecting a particular one of the second user equipment(s) for which to send data over the backhaul link, said selecting being based on the amount of data buffered for each of the second user equipment(s) at the small cell base station.

The selected second user equipment may be that which has the least amount of buffered data.

The method may further comprise receiving from the small cell base station data indicative of the amount of data currently buffered for each of its second user equipment(s).

The time unit or interval may be a Transmission Time Interval (TTI).

A second aspect of the invention provides a non-transitory computer-readable storage medium having stored thereon computer-readable code, which, when executed by at least one processor, causes the at least one processor to perform a method, comprising: in a large cell base station of a cellular communication system, providing data representing target allocation proportions of a time-frequency resource of the large cell base station, for each of (i) one or more first user equipment(s) associated with the large cell base station, and (ii) one or more backhaul link(s) to respective small cell base station(s) within the coverage area of the large cell base station; and allocating the resource, for each of a series of time units or intervals, either to a selected first user equipment or backhaul link based on the target data.

A third aspect of the invention provides an apparatus, the apparatus having at least one processor and at least one memory having computer-readable code stored thereon which when executed controls the at least one processor: in a large cell base station of a cellular communication system, to provide data representing target allocation proportions of a time-frequency resource of the large cell base station, for each of (i) one or more first user equipment(s) associated with the large cell base station, and (ii) one or more backhaul link(s) to respective small cell base station(s) within the coverage area of the large cell base station; and to allocate the resource, for each of a series of time units or intervals, either to a selected first user equipment or backhaul link based on the target data.

A fourth aspect of the invention provides an Apparatus configured to perform the method of: in a large cell base station of a cellular communication system, providing data representing target allocation proportions of a time-frequency resource of the large cell base station, for each of (i) one or more first user equipment(s) associated with the large cell base station, and (ii) one or more backhaul link(s) to respective small cell base station(s) within the coverage area of the large cell base station; and allocating the resource, for each of a series of time units or intervals, either to a selected first user equipment or backhaul link based on the target data.

BRIEF DESCRIPTION OF THE DRAWINGS

The invention will now be described, by way of non-limiting example, with reference to the accompanying drawings, in which.

DETAILED DESCRIPTION OF PREFERRED EMBODIMENTS

Embodiments herein relate to the signalling coordination of scheduling of time-frequency resources for wireless self-backhaul links between, for example, at least one macro cell and one or more small cells within a given macro cell.

FIGS. 1 to 7 relate to allocation methods and systems which employ a time separation between control information and data transmitted on a self-backhaul link between a macro cell and a small cell.

Figure 1:
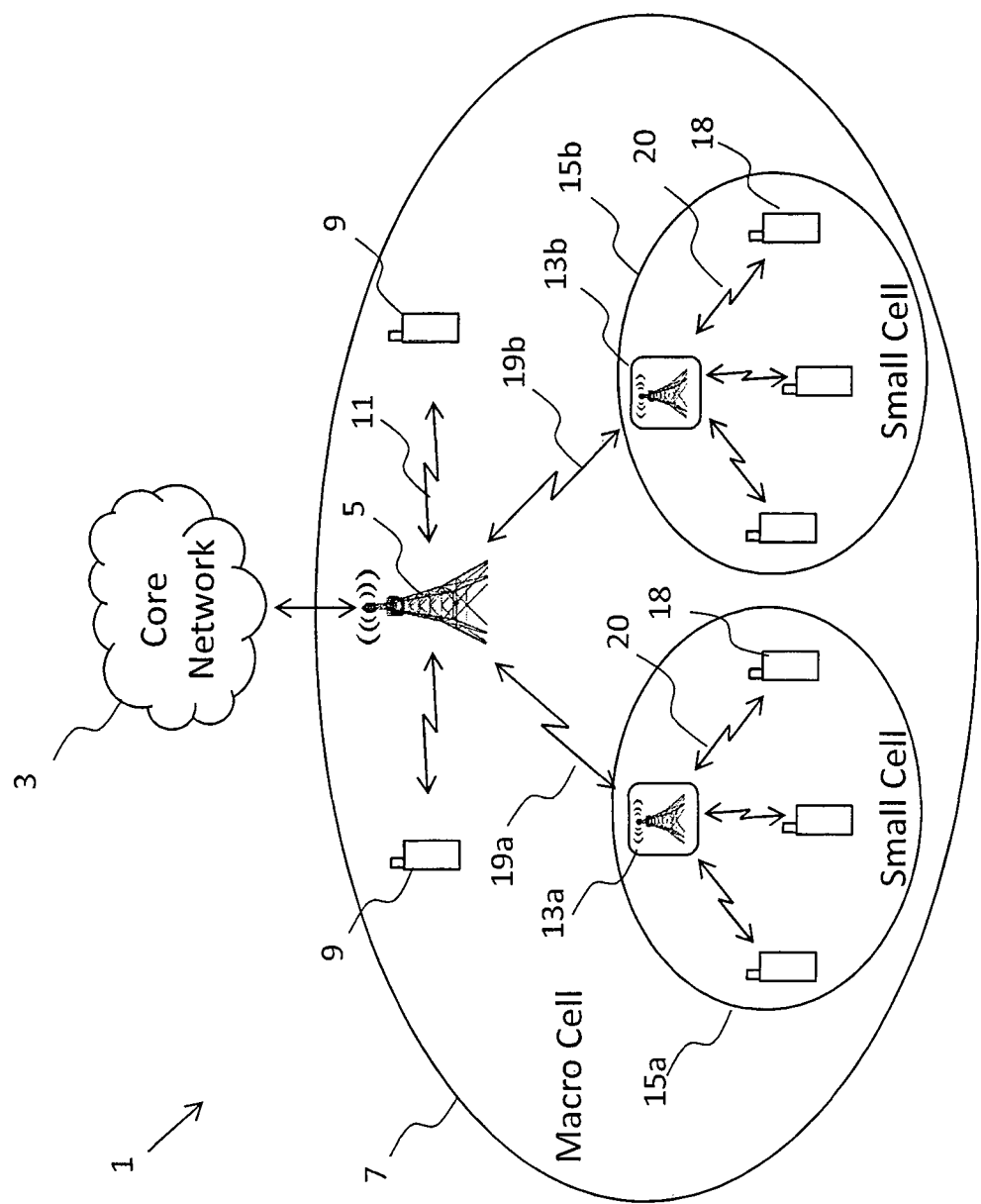
FIG. 1 is a schematic diagram of a mobile network comprising macro cells and small cells.

FIG. 1 shows part of an example mobile communications network 1, comprising a core network 3 connected to one or more macro base stations, or enhanced base stations (eNBs) 5. The eNBs 5 each define a so-called macro cell 7. Within the macro cell 7 may be one or more first 'macro' UEs 9 which may be any form of mobile terminal capable of wireless communications with the eNB 5. For example, the first UEs 9 may be one or more of mobile telephones, smartphones, tablet computers and so on. Communication between the eNB 5 and the first UEs 9 may take place over respective wireless access links 11 using known methods.

Within the macro cell 7 may be provided one or more small cells, or more particularly, small cell base stations or small cell eNBs 13a, 13b which define the coverage areas of the respective small cells 15a, 15b. Small cell eNBs 13a, 13b may be referred to as 'relay nodes' and this terminology will be used throughout for ease of reference.

It will be appreciated, therefore, that macro cells 7 may be referred to as large cells given their relatively large coverage area compared to that of small cells 15a, 15b.

Within the small cells 15a, 15b may be one or more UEs 18 (hereafter referred to as second UEs to distinguish them from the first UEs 9) which may be any form of mobile terminal capable of wireless communications with the relay nodes 13a, 13b. For the avoidance of doubt, second UEs 18 are not in signal communication with the eNB 5, although may connect at a later time, for example after leaving the small cell 15a, 15b. For example, the second UEs 18 may be one or more of mobile telephones, smartphones, tablet computers and so on. The second UEs 18 may be the same or similar to the first UEs 9 outside of the small cells 15a, 15b, other than the fact they are associated with different base stations at a given time.

Communication between the macro cell base station 5 and the relay nodes 13a, 13b may be by means of a wired or wireless backhaul link. Given the potential cost and complexity of using, for example, optical fibre as the backhaul link, wireless backhaul links are preferable in many cases. In present embodiments, therefore, it is assumed that 'over the air' (OTA) self-backhaul links 19a, 19b are employed. A self-backhaul link 19a, 19b is one where the access links and the backhaul links may use the same wireless channel and therefore share the time-frequency resource of the link.

A relay node 13a, 13b is configured in use to operate in a so-called decode-and-forward mode. That is, a relay node 13a, 13b is configured to decode the data received for a second UE 18 on the self-backhaul link 19a, 19b, to store the data in a local buffer, and to schedule the data using the relay node's own scheduling decision. For this purpose, the relay nodes 13a, 13b may comprise a scheduler, or scheduler module. There may be a processing delay between when the relay node's scheduler makes the scheduling decision until the time when the data actually gets transmitted over the air to the appropriate small cell UE 18. The scheduler or scheduler module may be implemented in software, firmware, hardware or a combination thereof.

A Transmission Time Interval (TTI) is a form of time unit and relates to the encapsulation of data from higher levels into frames for transmission on the radio link layer. A TTI may be regarded as the duration of a transmission on the radio link. In LTE, a TTI may be referred to as a sub-frame having duration 1 ms, although future standards may be different. For data transmitted in an over the air TTI "t", if the processing delay at a relay node 13a, 13b is "n" TTIs, then a scheduling decision may be performed at TTI t-n at the scheduler.

As mentioned, the relay nodes 13a, 13b within the coverage area of a macro cell 7 receive in-band wireless backhaul connectivity using self-backhaul links. The relay nodes 13a, 13b may operate using either half-duplex or full-duplex modes.

Half-duplex relay nodes may either transmit or receive data over a given time-frequency resource. Half-duplex relay nodes therefore need to account for the half-duplex constraint, which means that a node may schedule its UEs in a TTI only if the self-backhaul link 19a, 19b is not scheduled in that TTI, assuming that the self-backhaul link 19a, 19b and the access links 20 are not multiplexed in the frequency domain due to adjacent channel interference.

Full-duplex relay nodes may transmit and receive data simultaneously over the same time-frequency resource. However, operating in full-duplex mode may be challenging because the node's own transmission may create interference at its receiver. Self-interference cancellation techniques may assist, but may not be ideal and there is typically residual interference. The scheduler of the relay nodes therefore need to determine whether or not data can be scheduled for a given second UE 18 and, if so, which UE to schedule and with which beam former and power to use so that the transmission on the self-backhaul link 19a, 19b will not be adversely affected.

Embodiments herein may provide time-separation of the data and the corresponding control information on a self-backhaul link 19a, 19b.

As mentioned above, a half-duplex relay node can either transmit or receive data in a given TTI on a given frequency resource; this constraint creates the need for a half-duplex relay node to know the scheduling decision of its higher-level macro eNB 5 in advance. By knowing said scheduling decision in advance, the scheduler of the relay nodes 13a, 13b can schedule transmission or reception of data for its own second UEs 18 in a TTI of a time-frequency resource, provided it is not receiving any data on the self-backhaul link 19a, 19b in that time-frequency resource.

As also mentioned above, full-duplex relay nodes can transmit and receive data simultaneously on the same time-frequency resource. In the presence of self-interference, as is known for full-duplex operation, the scheduling decision at the full-duplex relay nodes 13a, 13b need to take that into account in its scheduling and link adaptation decisions.

To provide for both situations, in some embodiments, a relay node 13a, 13b may be configured to receive scheduling information on the self-backhaul link in advance of scheduling data for the second UEs 18 within their respective small cell 15a, 15b. In broad terms, the relay nodes 13a, 13b are informed in advance as to when the macro eNB 5 will transmit data to it over the corresponding self-backhaul link 19a, 19b, so that the relay node can make appropriate scheduling decisions as regards transmitting data to the second UEs 18 within their respective small cell 15a, 15b.

In some embodiments, this is provided for by performing time-separation of a shared data channel and a control channel. The time-separation may be for downlink channels, for example the Physical Downlink Control Channel (PDCCH) and the Physical Downlink Shared Channel (PDSCH). Both the PDCCH and PDSCH are known channels in the context of LTE and the time-separation of similar or equivalent channels may be used in future technology standards, e.g. in 5G.

The PDCCH may carry scheduling assignments and other control data. In LTE, the PDCCH appears in the first 1, 2 or 3 OFDM symbols at the beginning of every TTI. The actual number of symbols used in a given TTI is communicated over the Physical Control Format Indicator Channel (PCFICH). The PDCCH in overview is responsible for allocating resources on the downlink PDSCH or uplink (Physical Uplink Shared Channel) as well as some signalling.

The PDSCH by contrast is the main data-bearing channel allocated on a dynamic and opportunistic basis. For LTE, PDSCH may use QPSK, 16QAM or 64QAM modulation, the eNB determining the appropriate modulation type based on an adaptation algorithm known as the Modulation and Coding Scheme (MCS).

Figure 2:
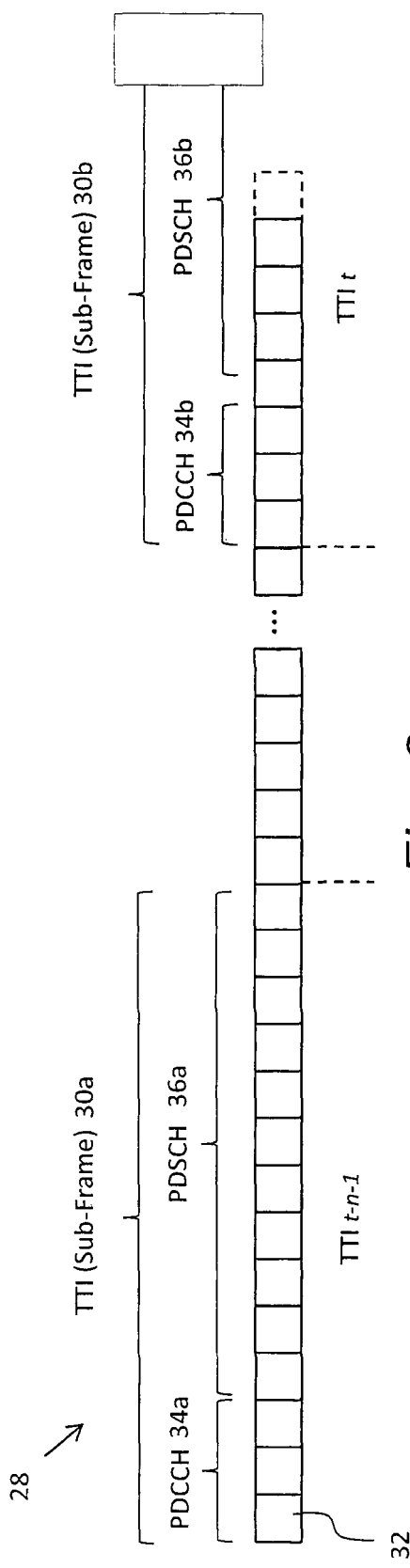
FIG. 2 is a schematic diagram of part of a time-frequency resource, showing successive transmission time intervals.

FIG. 2 is a schematic view of LTE resource allocation 28 for successive TTIs (or sub-frames) on a physical downlink channel, which is useful for understanding embodiments herein. In LTE, a TTI comprises fourteen OFDM symbols 32. The first three symbols may comprise the PDCCH and the following symbols may comprise the PDSCH. A first TTI 30a may be transmitted by the macro eNB 5 to one of the relay nodes 13a, 13b. The first TTI 30a may transmit on the PDCCH 34a downlink control information (DCI), including a future time when data will be transmitted by the macro eNB 5 to the relay node, for example on the PDSCH 36b of a subsequent TTI 30b. Based on this information, the relay node 13a, 13b may schedule when to transmit data to one or more of its second UEs 18, bearing in mind that the wireless channel is shared. The scheduling decision is dependent on whether the relay node is operating in half or full-duplex mode.

The transmission of control information, e.g. DCI, and data on the appropriate self-backhaul link 19a, 19b may therefore be separated in time by the macro eNB 5 transmitting PDCCH 34a for scheduling a future data transmission in an earlier TTI 30a than sending the corresponding data on PDCCH and/or PDSCH 34b, 36b. This is so that the relay node 13a, 13b, or more particularly its scheduler, can take the scheduling decision into account when determining whether or not to schedule transmissions (or receptions) to (or from) its own small cell UEs 18. The information in the PDCCH 34 may be used by the relay node 13a, 13b to determine the rank and the MCS for scheduling transmissions.

The time separation may be performed only at the macro cell eNB 5. The time separation may be performed only for the self-backhaul links 19a, 19b and not for the first UEs 9. The time separation is not performed at the relay node 13a, 13b which is served by a self-backhaul link 19a, 19b. At the relay node 13a, 13b with a self-backhaul link 19a, 19b, the PDCCH 34 and PDSCH 36 may typically have a smaller time-separation, or none at all. This is so that the relay node 13a, 13b may make use of the earlier PDCCH 34 received from the macro eNB 5 to make its own scheduling decision. We thus have a different and a larger timing offset between the PDCCH 34 and PDSCH 36 at the macro eNB 5 than at the relay node 13a, 13b.

In some embodiments, the macro eNB 5 may be configured to transmit its PDCCH 34 a few TTIs before a corresponding data transmission over PDSCH 36. In this case, the macro eNB 5 may transmit the scheduling information for the second UEs 18 in downlink control information (DCI) over the PDCCH by, at the latest, TTI t-n-1 (for an OTA transmission of PDSCH in TTI t.) Here, n refers to the "PHY" processing delay at the relay nodes 13a, 13b, or more particularly its scheduler. This is so that the scheduler module runs in TTI (t-n) for an over-the-air transmission in TTI t.

This would enable a half-duplex relay node 13a, 13b to schedule its own second UEs 18 in TTI t-n for a transmission over-the-air in TTI t of both PDCCH and PDSCH, after knowing whether or not the self-backhaul link has been scheduled for TTI t.

In the case of a full-duplex relay node 13a, 13b, the advance scheduling information at TTI (t-n-1, or earlier) enables the relay node 13a, 13b to determine the transmit power and compute the rank and MCS for scheduling data transmission to its own second UEs 18 taking into account the self-interference that may be caused.

Figure 3:
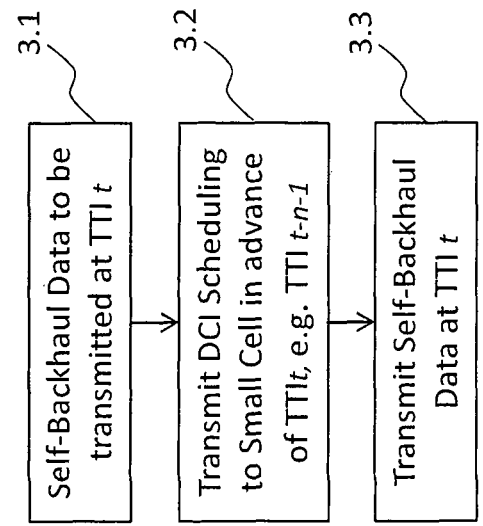
FIG. 3 is a flow diagram showing processing steps performed by a macro cell base station in accordance with embodiments.

FIG. 3 is a flow diagram showing processing steps that may be performed at the macro eNB 5 in accordance with embodiments. In a first step 3.1, the macro eNB 5 determines that it will transmit self-backhaul data in a later TTI t. In step 3.2, at an earlier time than TTI t; e.g. TTI t-n-1, the macro eNB 5 transmits over a first data channel, e.g. the PDCCH, a DCI message to the small cell relay node 13, said message indicating that self-backhaul data will be transmitted at TTI t over the air. In step 3.3, the self-backhaul data is transmitted to the small cell relay node 13 at TTI t.

Figure 4:
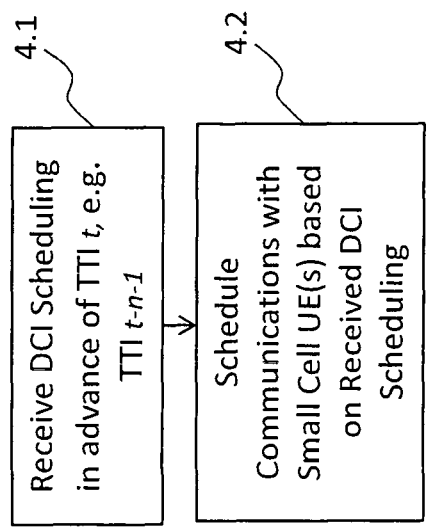
FIG. 4 is a flow diagram showing processing steps performed by a small cell base station in accordance with embodiments.

FIG. 4 is a flow diagram showing processing steps that may be performed at one or both of the small cell relay nodes 13a, 13b. In a first step 4.1, the small cell relay node 13a, 13b receives the DCI scheduling data from the macro eNB 5 in advance of the scheduled time TTI t, e.g. at TTI t-n-1. In step 4.2, the small cell relay node 13a, 13b makes one or more scheduling determination(s) based on the received DCI scheduling data.

Figure 5:
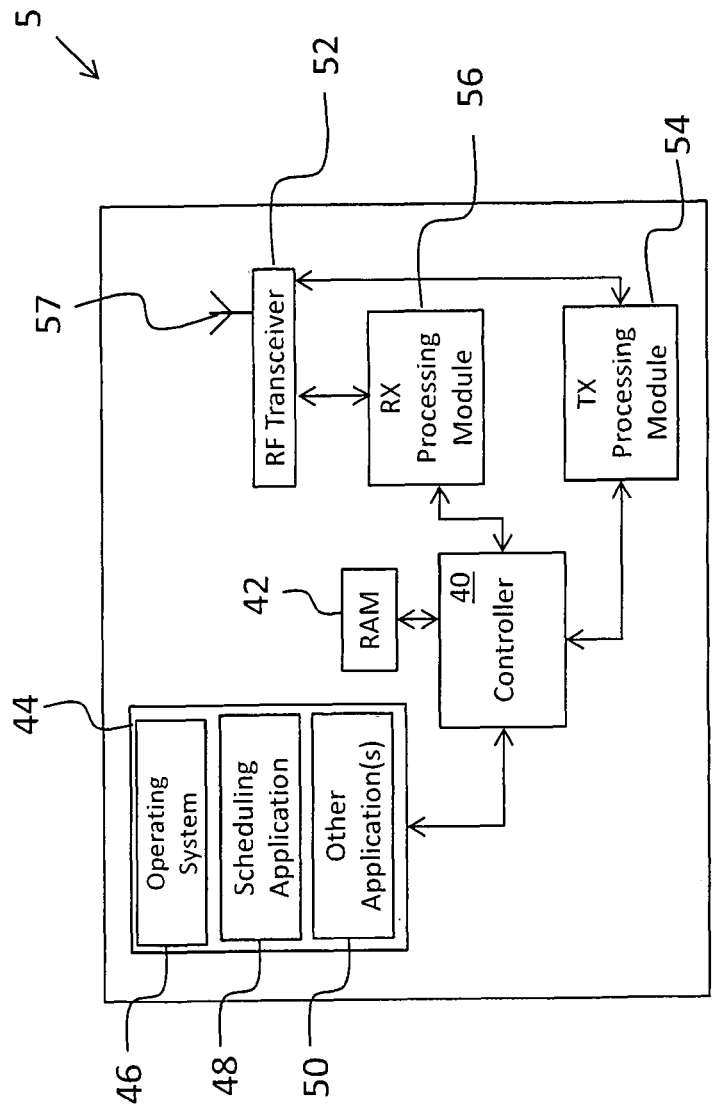
FIG. 5 is a block diagram showing components of either a macro cell base station or small cell base station in accordance with embodiments.

For completeness, FIG. 5 shows a schematic diagram of components of a base station, which can be either of both of the macro eNB 5 and the small cell relay nodes 13a, 13b. For ease of explanation, we will refer to the macro eNB 5 but it should be appreciated that identical or similar components may be in one or both of the relay nodes 13a, 13b.

The eNB 5 may have a controller 40, RAM 42 and a memory 44. Additionally, the eNB may have a RF transceiver 52, a receiver (RX) processing module 56, a transmitter (TX) processing module 54 and at least one RF antenna 57. The controller 40 is connected to each of the other components as shown in order to control operation thereof.

The memory 44 may be a non-volatile memory such as read only memory (ROM), a hard disk drive (HDD) or a solid state drive (SSD). The memory 44 stores, amongst other things, an operating system 46 and may store a scheduling software application 48 and one or more other software applications 50. In the case of the eNB 5, the scheduling software application 48 may be used for performing the processing steps shown in FIG. 3. In the case of a relay node 13a, 13b, the scheduling software application 48 may be used for performing the processing steps shown in FIG. 4.

The RAM 42 is used by the controller 40 for the temporary storage of data. The operating system 46 may contain code which, when executed by the controller 40 in conjunction with the RAM 42, controls operation of each of the hardware components of the eNB 5.

The controller 40 may take any suitable form. For instance, it may be a microcontroller, plural microcontrollers, a processor, or plural processors.

Figure 14:
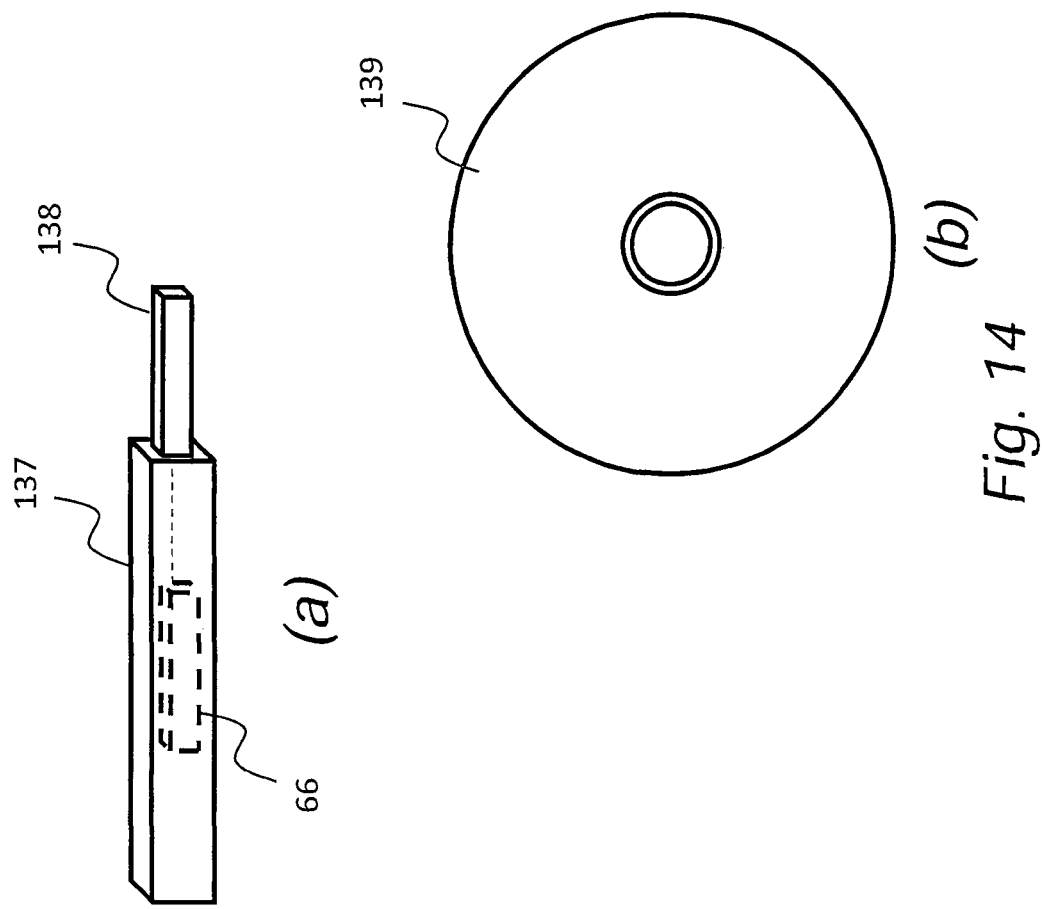
FIGS. 14a and 14b show tangible media, respectively a removable memory unit and a compact disc (CD), storing computer-readable code which when run by a computer perform methods according to embodiments of the invention.

In some embodiments, the eNB 5 may also be associated with external software applications not stored on the eNB. These may be applications stored on a remote server device and may run partly or exclusively on the remote server device. These applications may be termed cloud-hosted applications. The eNB 5 may be in communication with the remote server device in order to utilize the software application stored there. As shown in FIGS. 14a and 14b, the external software applications may be stored on tangible computer readable media.

Figure 6:
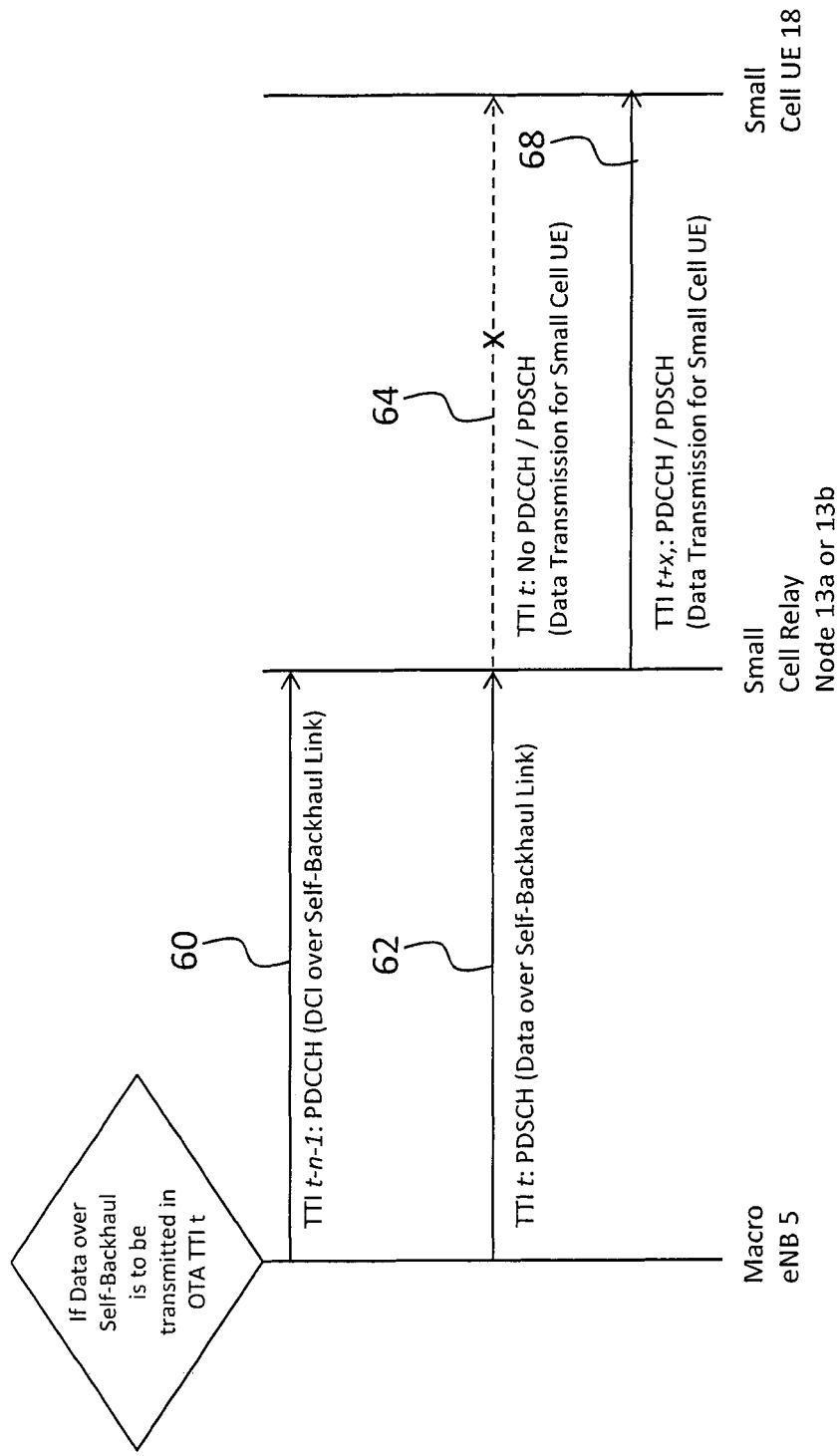
FIG. 6 is a timing diagram showing message flow on channels for a half-duplex mode of operation in accordance with embodiments.

Referring to FIG. 6, a timing diagram is shown indicating the FIGS. 3 and 4 processes, specifically for the case in which a relay node 13a, 13b operates in half-duplex mode. It is assumed that the macro eNB 5 intends sending data over one of the self-backhaul links 19a, 19b in an OTA ITT t. At an earlier time, TTI t-n-1, indicated by message 60, a DCI message is transmitted on the PDCCH to the relay node 13am 13b. The message 60 will identify this scheduling to the relay node 13a, 13b, i.e. that data will be transmitted in ITT t. This enables the relay node 13a, 13b to make scheduling decisions, taking account of the fact that it operates in half-duplex mode and is therefore subject to certain constraints.

At ITT t, indicated by message 62, the macro eNB 5 transmits the data on the PDSCH to the appropriate relay node 13a, 13b. The broken line 64 indicates that no data may be transmitted by the relay node 13a, 13b to any second UE 18 at ITT t because of the half-duplex constraint. Rather, the relay node 13a, 13b is configured to schedule a later transmit TTI, indicated by message 68, for sending data to one or more second UEs 17, e.g. at TTI t+x, where x is an integer given that the macro eNB does not intend to transmit data in TTI t+x.

Figure 7:
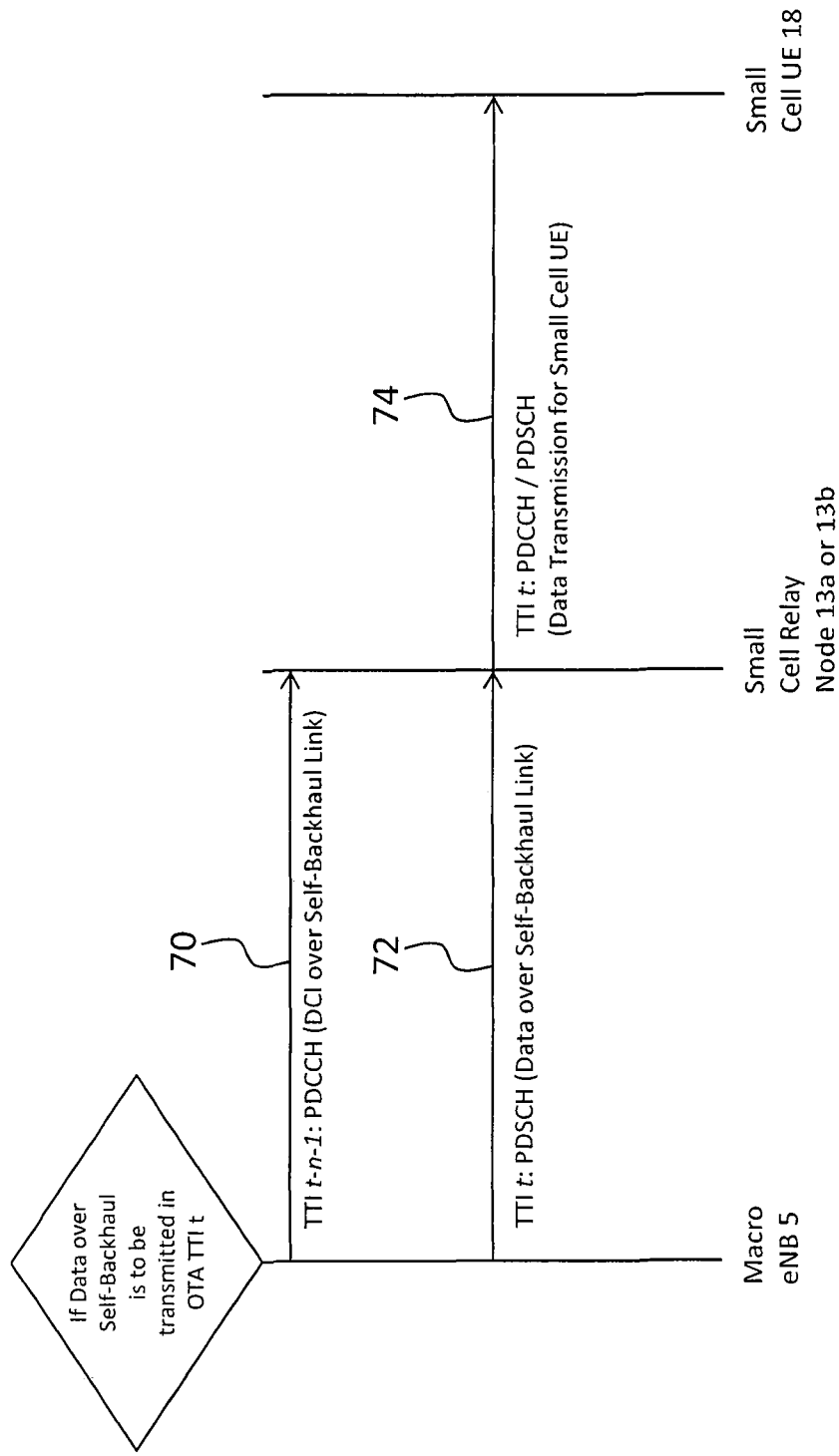
FIG. 7 is a timing diagram showing message flow on channels for a full-duplex mode of operation in accordance with embodiments.

Referring to FIG. 7, a timing diagram is shown indicating the FIGS. 3 and 4 processes, specifically for the case in which the small cell relay node 13 operates in full-duplex mode. Similar to FIG. 6, it is assumed that the macro eNB 5 intends sending data over one of the self-backhaul links 19a, 19b in an OTA ITT t. At an earlier time, TTI t-n-1, indicated by message 70, a DCI message is transmitted on the PDCCH to the appropriate relay node 13a, 13b. The message 70 will identify this scheduling to the relay node 113a, 13b; i.e. that data will be transmitted in ITT t. This enables the relay node 13a, 13b to make scheduling decisions, taking account of the fact that it operates in full-duplex mode. As such, the scheduler of the relay node 13a, 13b is not subject to the same constraint as in FIG. 6, because it may send and receive data simultaneously. However, the relay node 13a, 13b may have to take into account self-interference. In either case, the relay node 13a, 13b will make a scheduling decision, for example, to determine whether to schedule transmission of data to a particular second UE 18, which transmit beamformer to use, the transmit power and the MCS/rank. At ITT t, indicated by the message 72, the macro eNB 5 transmits the data on the PDSCH to the relay node 13a, 13b. The message line 74 indicates that data may be transmitted by the relay node 13a, 13b to any small cell UE 18 at ITT t based on the above scheduling decision. It may however also decide to transmit data at a later time.

In some embodiments, the macro eNB 5 may transmit scheduling information to both its own first UEs 9 and on the self-backhaul links 19a, 19b at a different time compared to receiving scheduling information from the one or more relay nodes 13a, 13b. So, the first UEs 9 (which are anchored to the macro eNB 5) and the non-anchored second UEs 17 may be informed about the timing difference and therefore handle the processing appropriately. For example, when a first UE 9 hands over from the macro eNB 5 to a relay node 13a, 13b, or vice-versa, the UE 9 will have a different timing relation between its PDCCH reception and its PDSCH reception. This may ease the implementation of the above at the macro eNB 5.

In some embodiments, this timing difference applies only to the self-backhauled links 19a, 19b, but not to any of the first or second UEs 9, 18, including the UEs attached to the macro cell 7. So, the UEs 9, 18 will always expect the PDCCH and PDSCH channels having the same timing relationship (e.g. same relative TTIs) as handovers are performed between a macro cell 7 and a small cell 15. However, the small cell 15a, 15b may expect a different, larger time separation between its PDCCH and PDSCH channel receptions. The macro cell 7 may thus have a different PDCCH transmission time for its UEs and for its self-backhaul links 19a, 19b. This may ease the implementation of the above at the small cell relay node 13a, 13b.

Figure 8:
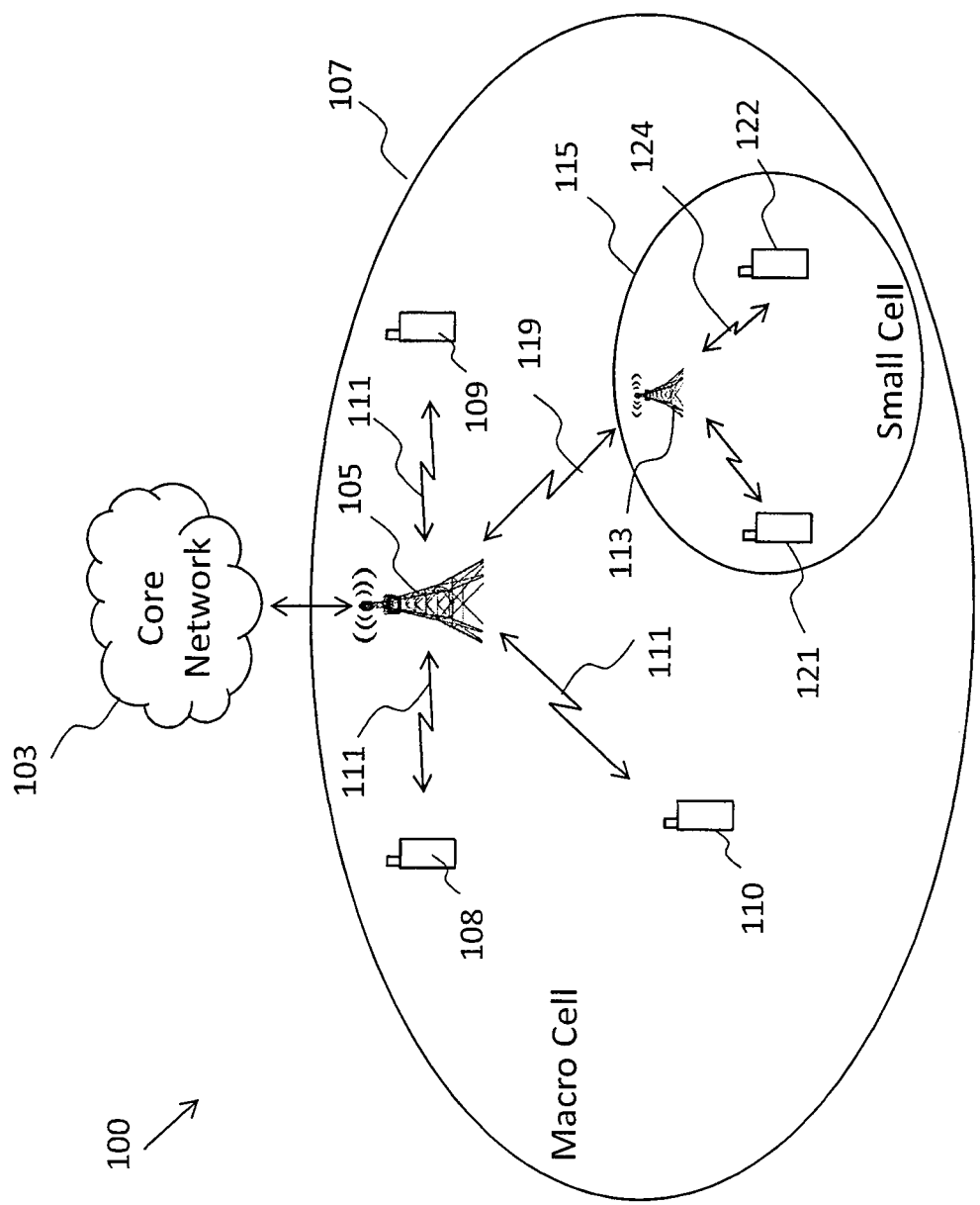
FIG. 8 is a schematic diagram of a further mobile network comprising macro cells and small cells.

Referring now to FIGS. 8 to 14, embodiments will now be described in which macro eNBs and relay nodes may schedule resources in an improved and more efficient way. FIG. 8 shows part of an example mobile communications network too, similar to the FIG. 1 example, comprising a core network 103 connected to a macro base station, or enhanced base station (eNB) 105. The eNB 105 defines a so-called macro cell 107. Within the macro cell 107 are three first 'macro' UEs 108, 109, 110 which may be anchored to the eNB 105. The first UEs 108, 109, 110 may be any form of mobile terminal capable of wireless communications with the eNB 105. For example, the first UEs 108, 109, 110 may be one or more of mobile telephones, smartphones, tablet computers and so on. Communication between the eNB 105 and the first UEs 108, 109, 110 may take place over respective wireless access links 111 using known methods.

Within the macro cell 107 may be provided a small cell base station or small cell eNB 113 which defines a small cell coverage area 115. As before, the small cell base station 113 will be referred to as a relay node for ease of reference.

Two UEs 121, 122 are within, and associated with, the small cell 115 (the UEs being hereafter referred to as second UEs to distinguish them from the first UEs 108, 109, 110). The second UEs 121, 122 may be any form of mobile terminal capable of wireless communications with the relay node 113. For the avoidance of doubt, second UEs 121, 122 are not in signal communication with the eNB 105, although may connect at a later time, for example after leaving the small cell 115. For example, the second UEs 121, 122 may be one or more of mobile telephones, smartphones, tablet computers and so on. The second UEs 121, 122 may be the same or similar to the first UEs 108, 109 outside of the small cell 115, other than the fact they are associated with different base stations at a given time.

Communication between the eNB 105 and the relay nodes 113 is by means of a wireless self-backhaul link 119. The self-backhaul link 119a uses the same wireless channel (i.e. shares the same time-frequency resource) as the macro cell access links 111.

In overview, the eNB 105 may be configured to allocate its time-frequency resource, for example particular TTIs, either to one of the first UEs 108, 109, 110 via the respective access links 111, or to the self-backhaul link 119. Allocating in this context means enabling the scheduled transmission or reception of data over these links 111, 119 at the particular TTI. The allocation may be performed in advance of actually transmitting or receiving data over the selected link, for example using methods described above with reference to FIGS. 1 to 7.

For example, if the eNB 105 has data to transmit to the first UE 108, it may allocate this transmission to a particular TTI in advance of transmitting the data. This TTI is then scheduled to the first UE 108 and the same TTI cannot be used for receiving or transmitting data to one of the second UEs 121, 122 via the self-backhaul link 119. By informing the relay node 113 in advance of the particular TTI, the relay node 113 will not transmit data on the self-backhaul link 119 at the same TTI but may transmit buffered data to a selected second UE 121, 122.

Further, methods are described relating to how the relay node 119 may allocate its own resources, for example when to transmit data to a selected on of its EUs 121, 122 over respective access links 124.

In overview, the methods may involve determining target long-term proportions or fractions of the time-frequency resource that may be allocated to each of the first UEs 108, 109, 110 (or their respective access links 111) and to the self-backhaul link 119. The target long-term proportions or fractions are optimised, as will be described below. The target proportions or fractions may be stored locally at the eNB 105 or externally, for example in a cloud device (not shown) or on the tangible computer-readable media shown in FIGS. 14(a) and 14(b). The eNB 105 and the relay node 113 may comprise the same components and software applications shown in FIG. 5.

During operation, the current proportion or fraction of resources allocated to each of the first UEs 108, 109, 110 and the self-backhaul link 119 is stored and updated over time, and the allocation of a particular TTI is based on a comparison of the current allocation data with the target data. In some embodiments, for a particular current or future TTI, this may comprise allocating one of the first UEs 108, 109, 110 or the self-backhaul link 119 which has been served the least resources with regard to the target data. In this way, the allocations and scheduling should trend towards the target over time, which if optimised, should improve overall performance.

Figure 9:
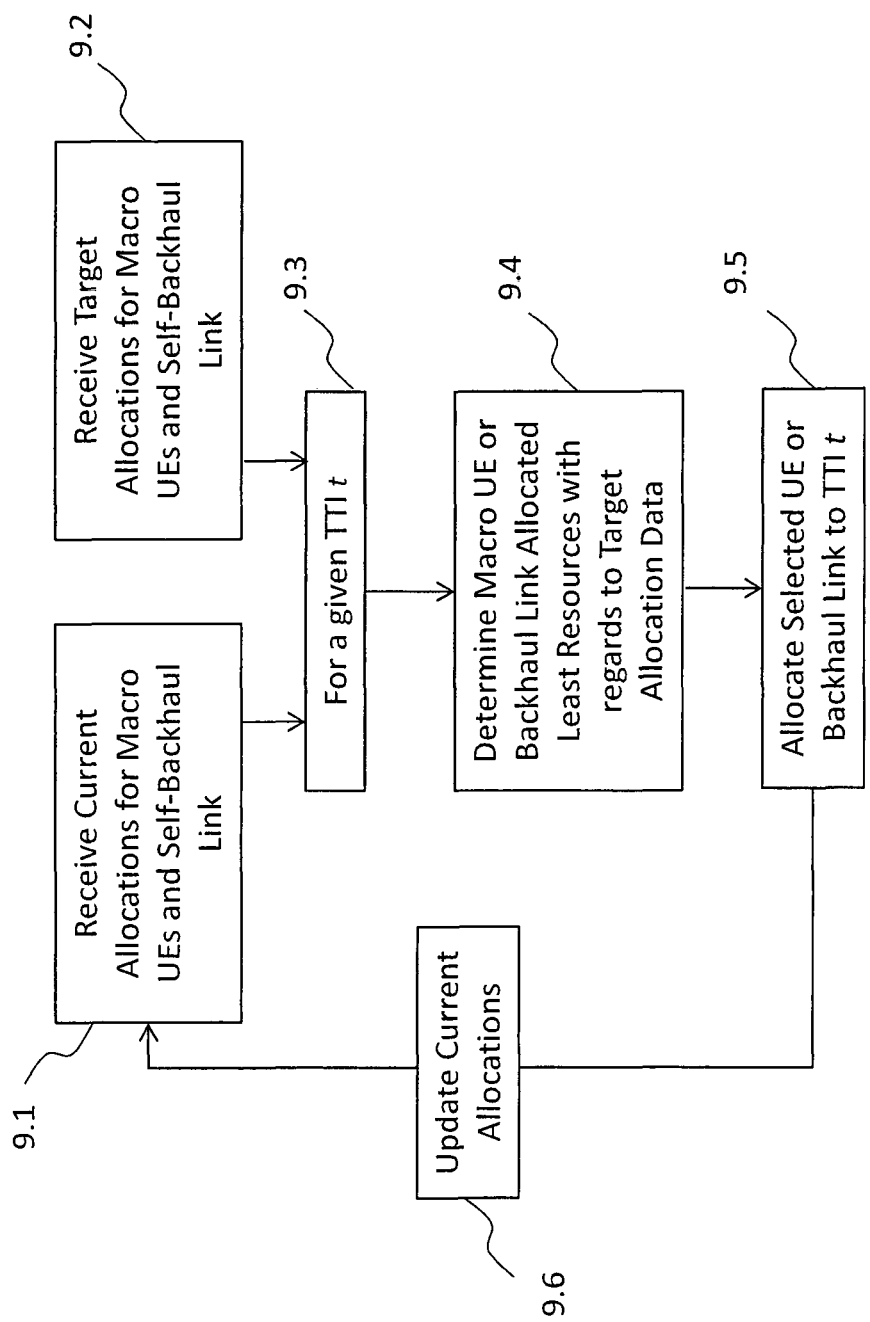
FIG. 9 is a flow diagram showing processing steps performed by a macro cell base station in accordance with further embodiments.

FIG. 9 shows processing steps that may be performed by a software application, e.g. the scheduling application 48 shown in FIG. 5, at the eNB 105. The processing steps may alternatively be implemented in firmware, hardware or a combination of each. In a first step 9.1, the current allocations for the first UEs 108, 109, 110 and the self-backhaul link 119 are received. In a second step 9.2, the target allocations for the first UEs 108, 109, 110 and the self-backhaul link 119 are received. Steps 9.2 may be performed in parallel or in any order. In a subsequent step 9.3 a given TTI is selected for allocation. In a subsequent step 9.4, it is determined which of the UEs 108, 109, 110 and the self-backhaul link 119 have been allocated the least resources (TTIs) with regard to the target data. In step 9.5, the identified UE 108, 109, 110, or the self-backhaul link 119 is allocated to the TTI. At the same time, or shortly after, the current allocations are updated in step 9.6. The process may repeat for a subsequent TTI.

Target or Optimised Allocations

In embodiments herein, the target allocations are optimised allocations. The derivation of the optimised allocations will now be explained.

Half-Duplex Operation

An optimisation problem for half-duplex mode of operation may be formulated as follows:

$$\max_{\rho_i, \rho_j^k, \rho_k^{sc}} \left\{ \sum_{i=1}^{M} \log(\rho_i R_i) + \sum_{k=1}^{S} \sum_{j=1}^{N_k} \log(\rho_j^k R_j^k) \right\} \quad (1)$$

which is subject to:

$$0 \leq \rho_i \leq 1 \,\forall\, i = 1, \ldots, M$$
$$0 \leq \rho_j^k \leq 1 \,\forall\, j = 1, \ldots, N_k, \,\forall\, k = 1, \ldots, S$$
$$0 \leq \rho_k^{sc} \leq 1 \,\forall\, k = 1, \ldots, S$$

$$\sum_{i=1}^{M} \rho_i + \sum_{k=1}^{S} \rho_k^{sc} \leq 1 \quad (2)$$

$$\sum_{j=1}^{N_k} \rho_j^k \leq 1 - \rho_k^{sc} \,\forall\, k = 1, \ldots, S \quad (3)$$

$$\sum_{j=1}^{N_k} \rho_j^k R_j^k \leq \rho_k^{sc} R_k^{sc} \,\forall\, k = 1, \ldots, S. \quad (4)$$

where M is the number of first UEs 108, 109, S is the number of small cells 115 served using self-backhaul links 119 and Nk is the number of second UEs 121, 122 served by a small cell k.

$\rho_i$ is the proportion or fraction of resources allocated to a first UE I, $\rho_j^k$ is the proportion or fraction of resources allocated to a second EU j in small cell k, and $\rho_k^{SC}$ is the proportion or fraction of resources allocated to the self-backhaul link to the small cell k.

It will be noted that equation (1) uses the commonly-used logarithm of user throughputs as its utility. Referring to equation (2), this reflects that the aggregate proportion or fraction of resources used by the eNB 105 cannot exceed one. It may be shown that this constraint needs to be met with equality at the optimal point, provided M>0. Otherwise, the utility can be increased by using the remaining resources to serve the first UEs 108, 109. Referring to equation (3), this reflects the so-called half-duplex constraint for a small cell k. The sum of the proportion or fraction of resources the small cell is transmitting the fraction it is receiving cannot exceed one. Referring to equation (4), this reflects the so-called flow conservation constraint. A small cell cannot send more traffic than what it received from the eNB 105. It can be shown that this constraint should be met with equality if M>0.

A solution to the optimisation problem in equation (1) is as follows. We may use the so-called Karush-Kuhn-Tucker (KKT) conditions to obtain the optimal operating point. It may be shown that if the following operating points are feasible, then there is an optimal solution.

$$\rho_i = \frac{1}{M + \sum_{K=1}^{S} N_k} \,\forall\, i \in MarcoUEs \quad (5)$$

$$\rho_k^{SC} = \frac{N_k}{M + \sum_{K=1}^{S} N_k} \,\forall\, k \in SmallCells \quad (6)$$

$$\rho_j^k = \frac{R_k^{SC}}{\left(M + \sum_{l=1}^{S} N_l R_j^k\right)} \,\forall\, jk \in SmallCellk \quad (7)$$

The last equation implies that $\rho_j^k R_j^k$ is a constant for a given small cell k. Thus, when the above values are feasible, the optimal solution is such that the macro eNB 105 allocates an equal share of resources to the first UEs 108, 109 and to the self-backhaul link 119 (or small cell) assuming that the small cell is equivalent to Nk UEs. The small cell relay node 113 may divide its allocated resources among its second UEs 121, 123 such that each is allocated the same number of bits.

The above values are feasible if the following condition holds for all k, i.e.

$$\sum_{j=1}^{N_k} \frac{R_k^{SC}}{R_j^k} < M + \sum_{\substack{l=1 \\ l \neq k}}^{S} N_l \quad (8)$$

The above values are feasible if the half-duplex constraint at the small cell 115 is not active.

Figure 10:
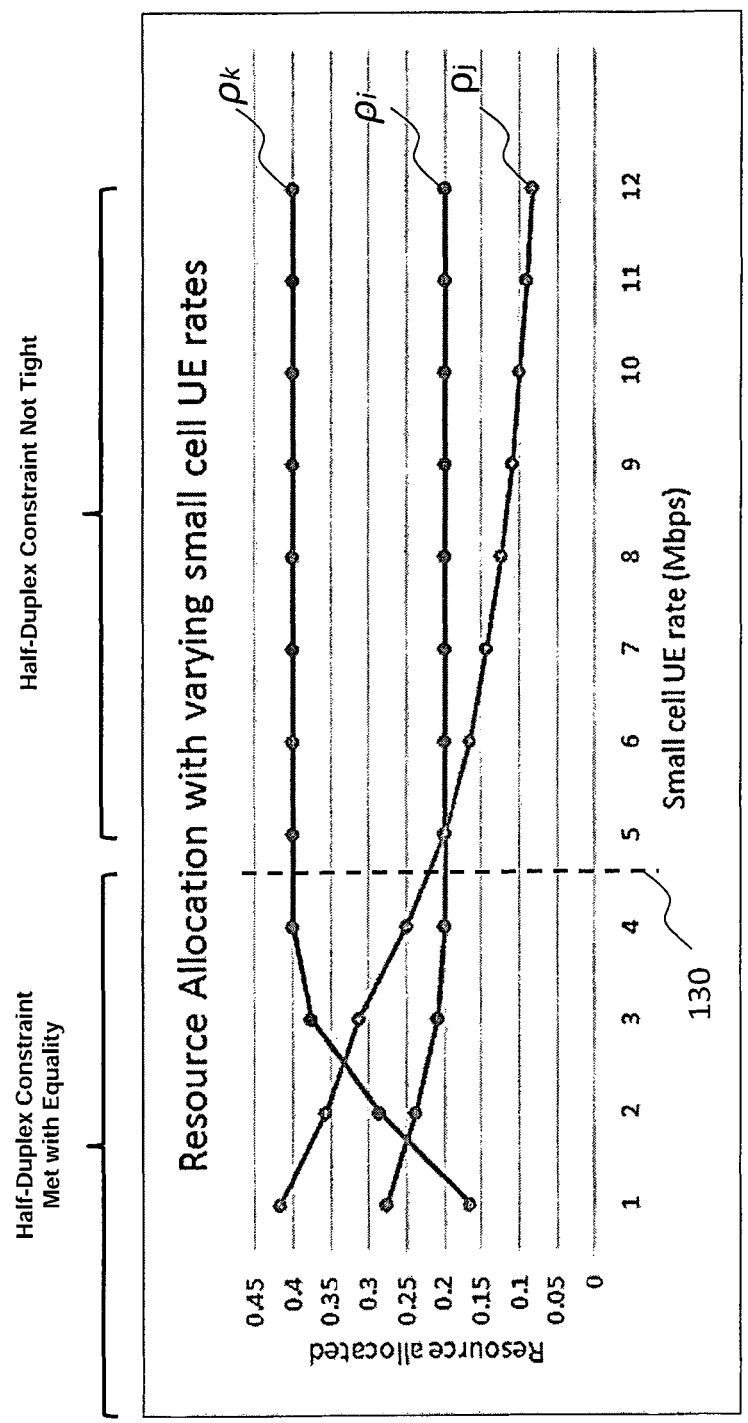
FIG. 10 is a graph showing variations in resource allocation proportions against increasing data rates, which is useful for understanding embodiments.

FIG. 10 is a graph illustrating the variation in resource allocation proportions, or fractions, using equations (5), (6) and (7) when plotted against increasing data rates for the second UEs 121, 122, i.e. the x-axis. In this illustration, we assume the FIG. 8 situation, where we have three first UEs 108, 109, 111 and two second UEs 121, 122. So:

M=3;
S=1; and
Nk=2.

We also assume that the self-backhaul link 119 has a data rate R of 5 Mbits/sec. and that the two second UEs 121, 122 have the same data rates plotted on the x-axis. It will be seen that, when the second UEs 121, 122 data rates are small compared with that of the self-backhaul link 119, the half-duplex constraint in (3) will not be satisfied. This occurs in this case for data rates of approximately 3.33 Mbits/sec. or less, indicated by the threshold line 130. However, when the data rates are above this threshold 130, then the values given by equations (5), (6) and (7) are feasible and hence the solution is considered optimal.

It will be seen that, beyond the threshold 130, the self-backhaul link 110 will be allocated a 40% proportion of the time-frequency resources, and each first UE 108, 109, 110 will be allocated a 20% proportion of the time-frequency resources.

Upon determining this scenario, therefore, the above figures may be stored as the target allocations and provided, as in step 9.2 of the FIG. 9 method.

We may compare the above optimal solution to a heuristic solution when the half-duplex constraint is active, and the condition in (8) is not met. First, we determine the resources using (5), (6) and (7) above, assuming the condition (8) is met. Next, in a second step, we scale down the proportion or fraction of resources for the self-backhaul link 119 of small cells k that violate the half-duplex constraint such that the constraint is met with equality, i.e.:

$$\sum_{j=1}^{N_k} \frac{R_k^{SC}}{R_j^k} < M + \sum_{\substack{l=1 \\ l \neq k}}^{S} N_l \qquad (9)$$

$$\rho_j^{k'} = \frac{\rho_k^{sc'} R_k^{sc}}{N_k R_j^k} \forall j \in \text{Small cell } k \qquad (10)$$

The resources which remain after re-computing $\rho_k^{SC'}$ are distributed among the first UEs 108, 109, 110 and the remaining self-backhaul links with an inactive half-duplex constraint, i.e.:

$$\rho_i' = \frac{M\rho_i + \sum_{\substack{k \in S \\ k \notin K}} \rho_k^{sc} + \sum_{k \in K} \left(\rho_k^{sc} - \rho_k^{sc'}\right)}{M + \sum_{\substack{k \in S \\ k \notin K}} N_k} \qquad (11)$$

$\forall i \in \text{Macro } UEs$ $$\rho_l^{sc'} = N_k \rho_i' \forall l \notin K, l \in S \qquad (12)$$

It can be verified that the above allocation in the second step meets the half-duplex constraint with equality for a cell k, i.e.:

$$\Sigma_{j=1}^{N_k} \rho_j^{k'} + \rho_k^{sc'} = 1 \qquad (13)$$

If as a result of (12) a different small cell fails to satisfy condition (8), then we execute the same procedure as above for the or each such small cell(s). Using simulations, it has been seen that the gap between the heuristic solution and the optimal solution, solved numerically, is very small.

Full-Duplex Operation

An optimisation problem for full-duplex mode of operation may be formulated as follows:

$$\max_{\rho_i, \rho_j^k, \rho_k} \left\{ \sum_{i=1}^{M} \log(\rho_i R_i) + \sum_{k=1}^{S} \sum_{j=1}^{N_k} \log(\rho_j^k R_j^k) \right\} \qquad (14)$$

which is subject to:

$0 \leq \rho_i \leq 1 \forall i = 1, \ldots, M$ $0 \leq \rho_j^k \leq 1 \forall j = 1, \ldots, N_k, \forall k = 1, \ldots, S$ $0 \leq \rho_k^{sc} \leq 1 \forall k = 1, \ldots, S$ $$\sum_{i=1}^{M} \rho_i + \sum_{k=1}^{S} \rho_k^{sc} \leq 1 \qquad (15)$$

$$\sum_{j=1}^{N_k} \rho_j^k R_j^k \leq \rho_k^{sc} R_k^{sc} \forall k = 1, \ldots, S \qquad (16)$$

$$\sum_{j=1}^{N_k} \rho_j^k \leq 1 \forall k = 1, \ldots, S \qquad (17)$$

We assume that the rate R accounts for the interference impact due to full-duplex operation. Equation (15) refers to the aggregate fraction of resources used by the first UEs not exceeding one. Equation (16) refers to the flow conservation constraint in which the second UEs cannot be served more data than what the small cell receives on the self-backhaul link. Equation (17) refers to the aggregate fraction of resources used by any small cell not exceeding one.

It is found that the closed-form solution for full-duplex small cells match (5), (6) and (7) as above, i.e. where the small cells use half-duplex operation, assuming (8) is satisfied, and providing the following condition holds for all k:

$$\sum_{j=1}^{N_k} \frac{R_k^{sc}}{R_j^k} \leq M + \sum_{l=1}^{S} N_l, \qquad (18)$$

which is a more relaxed constraint compared to the corresponding condition for half-duplex cells, i.e. see (8).

Figure 11:
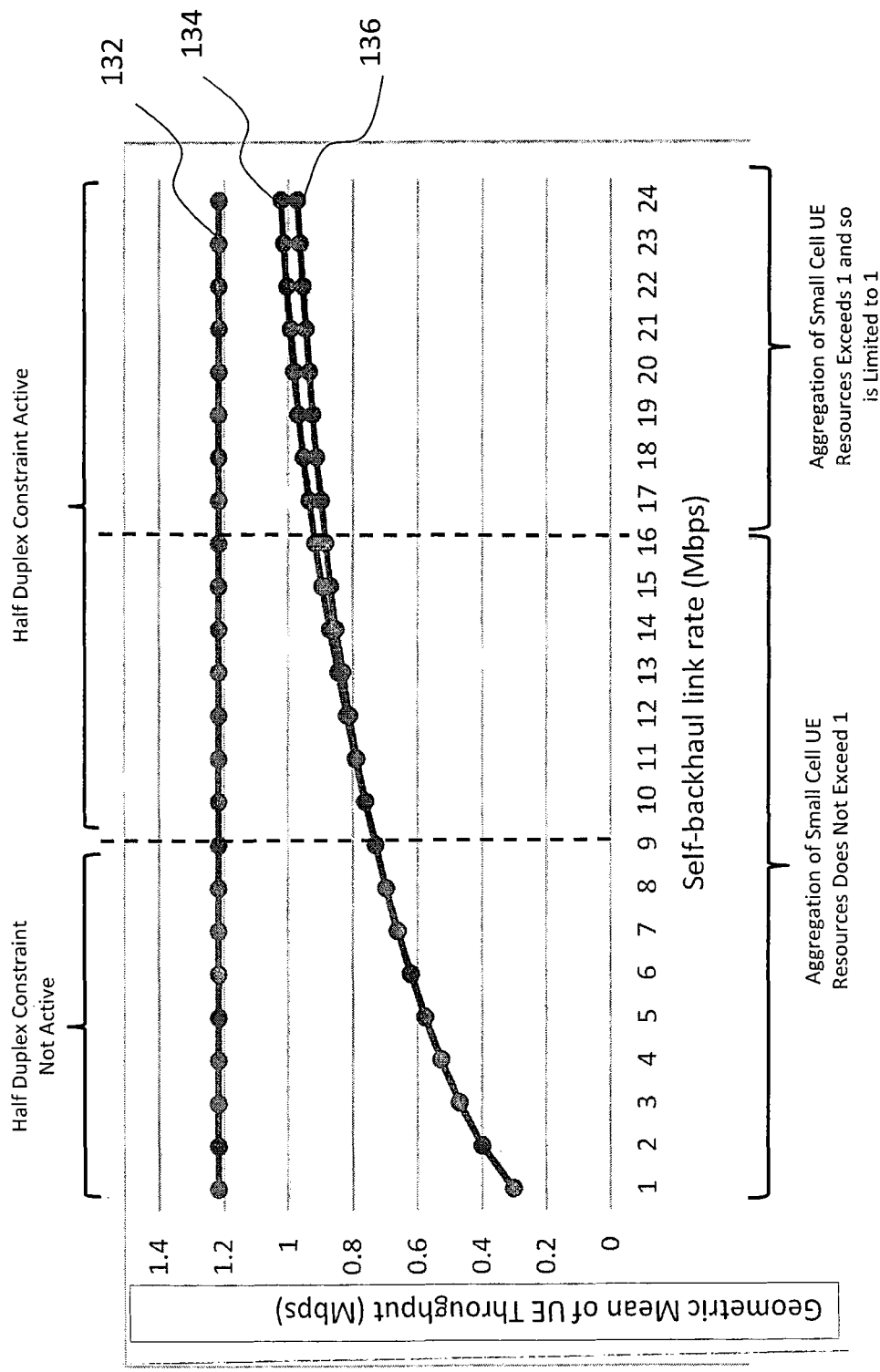
FIG. 11 is a graph showing the performance gains of a full duplex over half-duplex self-backhauled network.

FIG. 11 shows the output from a numerical example, based on the FIG. 8 scenario. The second UEs 121, 122 are assumed to have a data rate of 6 Mbits/sec. Reference numeral 132 refers to a baseline (for comparison) using a wired backhaul. Reference numeral 134 refers to a full-duplex self-backhaul and reference numeral 136 refers to a half-duplex self-backhaul. The full-duplex self-backhaul shows some gain over the half-duplex case, when the data rates of the self-backhaul links and the second UEs 121, 122 are such that (8) is not satisfied. This happens when the self-backhaul rates are large and the second UE rates are not so large in comparison. However, when the condition in (8) is satisfied, then the performance of both types of self-backhaul link is the same.

Allocation Decisions

It will therefore be appreciated that, for a given network scenario, such as that shown in FIG. 8, the eNB 105 may determine and store the optimised target allocations, which are $\rho_i^*$ and $\rho_k^{SC*}$.

In the flow diagram of FIG. 9, these are the values provided in step 9.2.

At a given time, the values provided in step 9.1 are the current proportions or fractions of allocations, i.e. $\rho_i(t)$ and $\rho_k^{SC}(t)$ as aggregated or filtered over time using an Infinite Impulse Response (IIR) filter.

Therefore, in performing step 9.4 for a given TTI t, the eNB 105 allocates the TTI to one of the first UEs 108, 109, 110 or the self-backhaul link 119 which satisfies the following:

$$\min_{\forall i \in M, \forall k \in S} \left( \frac{\rho i(t)}{\rho i^*}, \frac{\rho_k^{SC}(t)}{\rho_k^{SC*}} \right) \qquad (19)$$

If one of the first UEs 108, 109, 110 is allocated for a particular TI, then the small cell relay node 113 may be notified over the self-backhaul link 119 so that it can perform a local allocation in the same TTI, i.e. for transmitting or receiving data to one of the second UEs 121, 122.

Figure 12:
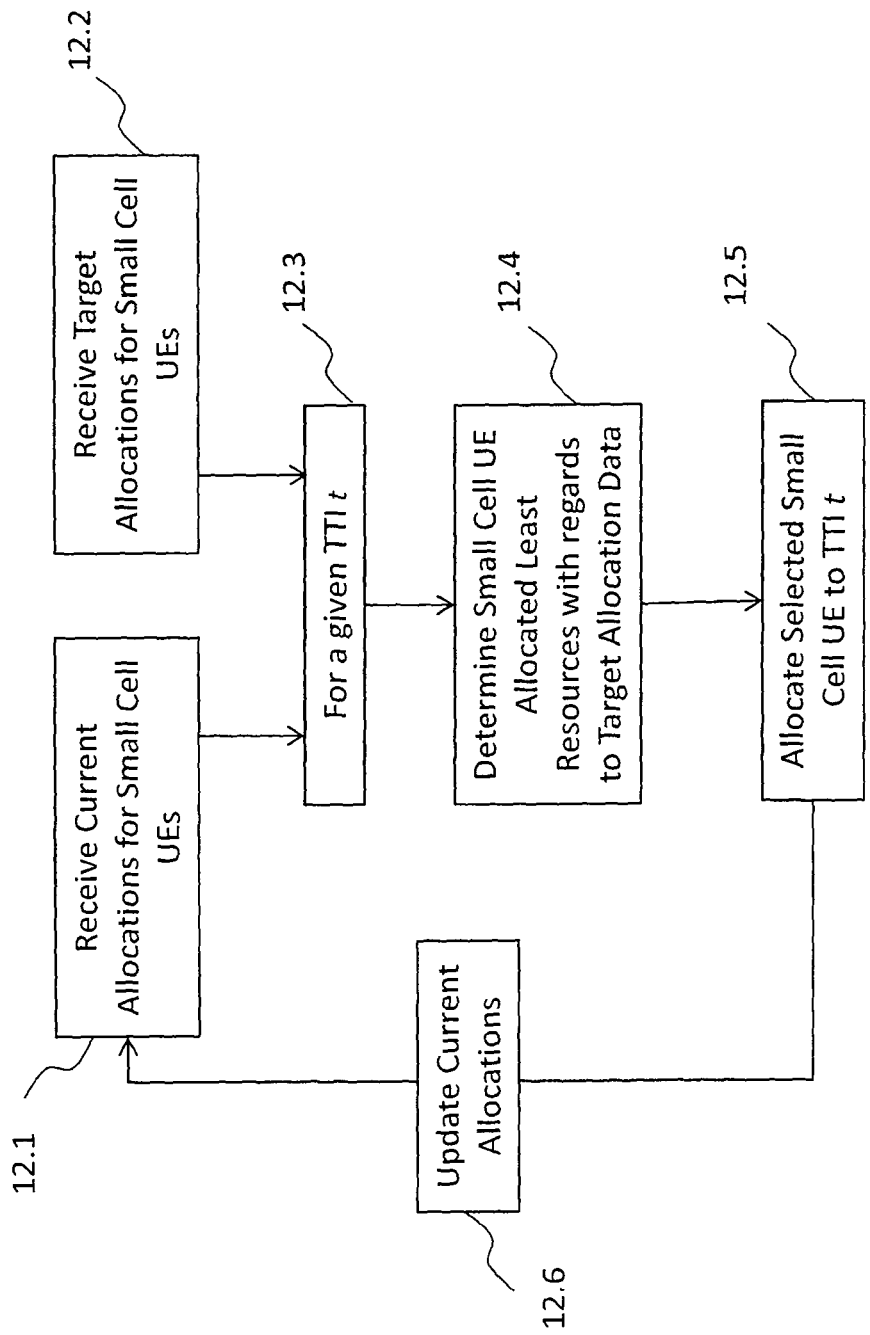
FIG. 12 is a flow diagram showing processing steps performed by a small cell base station in accordance with further embodiments.

At the relay node 113, a similar allocation procedure is performed, for example using a scheduling application, or hardware or firmware, or a combination thereof. FIG. 12 is a flow diagram illustrating processing steps performed at the relay node responsive to the eNB 105 informing it that it may schedule its own UEs 121, 122.

In a first step 12.1, the current allocations for the second UEs 121, 122 are received. In a second step 12.2, the target allocations for the second UEs 121, 122 are received. Steps 121 and 12.2 may be performed in parallel or in any order. In a subsequent step 12.3 the current TTI is selected for allocation. In a subsequent step 12.4, it is determined which of the UEs 121, 122 have been allocated the least resources (TTIs) with regard to the target data. In step 12.5, the identified second UE 121, 122 is allocated to the TTI. At the same time, or shortly after, the current allocations are updated in step 12.6. The process may repeat for a subsequent TTI when the eNB 105 notifies the relay node 113 that the self-backhaul link 119 is not scheduled.

The determination made in step 12.4 may be expressed as:

$$\min_{j=1\ldots N_k} \left( \frac{\rho_j^k(t)}{\rho_j^{k*}} \right) \quad (20)$$

In the situation where the eNB 105, in performing step 9.4, allocates the current TTI to the self-backhaul link 119, then a notification may be sent to the relay node 113 such that the relay node will not schedule transmission or reception of data to a second UE 121, 122 in the same TTI, i.e. because it is expecting to receive data from the eNB 105 in the same TTI.

As mentioned previously, with reference to FIGS. 1 to 7, this notifying may be performed in advance of actually sending the data. For example, the notification of a scheduled TTI may be transmitted in the PDCCH channel and the data transmitted subsequently in the PDSCH channel.

Responsive to determining allocating a TTI to the self-backhaul link 110, the eNB 105 may perform a further determination, namely to determine for which of the second UEs 121, 122 it is to transmit data in said TTI. For this purpose, the eNB 105 may receive from the relay node 113 the respective amounts of data buffered for each second UE 121, 122. The eNB 105 may be configured to transmit data for the second UE 121, 122 that has the least amount of buffered data.

Figure 13:
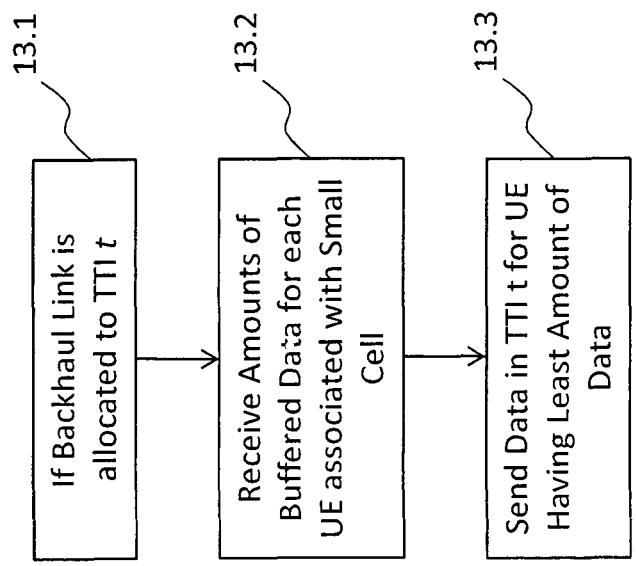
FIG. 13 is a flow diagram showing processing steps performed by the macro cell base station in accordance with further embodiments.

FIG. 13 is a flow diagram illustrating processing steps performed at the eNB 105 for this purpose. In a first step 13.1, the eNB 105 determines that a particular small cell (or its corresponding self-backhaul link 119) is allocated to a TTI t. In a second step 13.2, the eNB 105 receives the current amounts of data buffered at the relay node 113 for each of the second UEs 121, 122. In a third step 13.3, data is sent in the TTI t for the UE 121, 122 having the least amount of buffered data. It will be appreciated that steps 13.1 and 13.2 can be re-ordered, or performed in parallel. The aim is to provide maximum, or improved, flexibility to a small cell relay node 113 so that it may schedule its second UEs 121, 122 and to minimise the chance that the relay node 113 will run out of data for any second UE so long as the eNB 105 has data for the second UEs.

FIGS. 14a and 14b show tangible media, respectively a removable memory unit 137 and a compact disc (CD) 139, storing computer-readable code which when run by a computer perform methods according to embodiments described above. The removable memory unit 137 may be a memory stick, e.g. a USB memory stick, having internal memory 138 storing the computer-readable code. The memory 138 may be accessed by a computer system via a connector 140. The CD 139 may be a CD-ROM or a DVD or similar. Other forms of tangible storage media may be used.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

We claim:

1. A method of allocating resources in a wireless network that includes one or more macro user devices served by a macro base station associated with a macro cell and a micro base station associated with a small cell that is served by the macro base station, the method comprising: determining a portion of downlink resources allocated to a self-backhaul link between the macro base station and the micro base station for the small cell; determining that a threshold condition is exceeded with respect to the self-backhaul link for the small cell; and decreasing, based on the determining, the portion of downlink resources allocated to the self-backhaul link for the small cell.

2. The method of claim 1 wherein the determining a portion of downlink resources allocated to a self-backhaul comprises: determining, by the macro base station, a portion of downlink resources allocated to a self-backhaul link between the macro base station and the micro base station for the small cell based on a number of small cell user devices served by the small cell.

3. The method of claim 1 wherein the determining a portion of downlink resources allocated to a self-backhaul comprises: receiving, by a micro base station associated with the small cell from the macro base station, information indicating the portion of downlink resources allocated to the self-backhaul link between the macro base station and micro base station for the small cell.

4. The method of claim 1 wherein the determining a portion of downlink resources allocated to a self-backhaul link comprises: determining, a portion of downlink resources allocated to a self-backhaul link for the small cell in a weighted proportion to the number of small cell user devices served by the small cell.

5. The method of claim 1 wherein the determining a portion of downlink resources allocated to a self-backhaul link comprises determining a portion of downlink resources allocated to user devices based on a number of user devices served by or over each of a plurality of wireless links, including: determining, by the macro base station, a portion of downlink resources allocated to an access link for each of one or more macro user devices; and determining, by the macro base station, a portion of downlink resources allocated to a self-backhaul link for the small cell in a weighted proportion to the number of small cell user devices served by the micro base station for the small cell.

6. The method of claim 1 wherein the determining that a threshold condition is exceeded comprises: determining that a sum of ratios of: 1) a data rate for the self-backhaul link for the small cell to 2) a data rate of an access link between the small cell and each of one or more small cell user devices served by the small cell, is greater than a threshold.

7. The method of claim 6 wherein the small cell comprises a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells other than the first small cell.

8. The method of claim 6 wherein the small cell comprises a first small cell, and wherein each of a plurality of small cells, including the first small cell, is served by the macro base station via a self-backhaul link between the small cell and the macro base station, and wherein the threshold comprises a sum of: 1) a number of all macro user devices served by a macro base station, and 2) a number of small cell user devices served by each of the plurality of small cells.

9. The method of claim 1 wherein the decreasing comprises: decreasing, by the macro base station, based on the determining, the portion of downlink resources allocated to the self-backhaul link for the small cell which frees up some of the resources that were allocated to the small cell; determining, by the macro base station, a portion of the freed up resources to be re-allocated to at least one of: an access link for one or more macro user devices served by the macro base station; and a self-backhaul link for one or more other small cells served by the macro base station.

10. The method of claim 1 wherein the small cell comprises a first small cell, and wherein the determining a portion of downlink resources allocated to a self-backhaul link for a small cell comprises: determining a portion of downlink resources allocated to the self-backhaul link for the first small cell based on a ratio of: 1) a number of small cell user devices served by the small cell to 2) a sum of A) a number of macro user devices served by the macro base station and B) a number of small cell user devices served by a micro base station for one or more small cells, including the first small cell, that are served by or receive resources from the macro base station via a self-backhaul link.

11. The method of claim 1 wherein the small cell comprises a first small cell, wherein the determining a portion of downlink resources allocated to a self-backhaul link for the first small cell comprises: receiving, by a macro base station from each of a plurality of small cells including the first small cell, a number of small cell user devices served by the small cell; determining a number of macro user devices served by the macro base station; and determining a portion of downlink resources allocated to a self-backhaul link for the first small cell based on the number of small cell user devices served by the first small cell, the number of small cell user devices served by all small cells that receive resources from the macro base stations, and the number of macro user devices served by the macro base station.

12. The method of claim 1 wherein the small cell schedules an amount of data equally to each small cell user device that is served by the small cell.

13. The method of claim 1 and further comprising: communicating, by the macro base station to the small cell, the portion of downlink resources allocated to the small cell.

14. An apparatus comprising at least one processor and at least one memory including computer instructions, when executed by the at least one processor, cause the apparatus to: allocate resources in a wireless network that includes one or more macro user devices served by a macro base station associated with a macro cell and a micro base station associated with a small cell that is served by the macro base station, wherein causing the apparatus to allocate comprises causing the apparatus to: determine a portion of downlink resources allocated to a self-backhaul link between the macro base station and the micro base station for the small cell; determine that a threshold condition is exceeded with respect to the self-backhaul link for the small cell; and decrease, based on the determining, the portion of downlink resources allocated to the self-backhaul link for the small cell.

15. The apparatus of claim 14 wherein additionally causing the apparatus to determining a portion of downlink resources allocated to a self-backhaul comprises:
1) determining, by the macro base station, a portion of downlink resources allocated to a self-backhaul link between the macro base station and the micro base station for the small cell based on a number of small cell user devices served by the small cell,
2) receiving, by a micro base station associated with the small cell from the macro base station, information indicating the portion of downlink resources allocated to the self-backhaul link between the macro base station and micro base station for the small cell,
3) determining, a portion of downlink resources allocated to a self-backhaul link for the small cell in a weighted proportion to the number of small cell user devices served by the small cell,
4) determining a portion of downlink resources allocated to user devices based on a number of user devices served by or over each of a plurality of wireless links, including:
determining, by the macro base station, a portion of downlink resources allocated to an access link for each of one or more macro user devices; and determining, by the macro base station, a portion of downlink resources allocated to a self-backhaul link for the small cell in a weighted proportion to the number of small cell user devices served by the micro base station for the small cell.

16. The apparatus of claim 15 wherein the apparatus comprising a small cell comprises a first small cell, and wherein each of a plurality of small cells, including the first small cell, is served by the macro base station via a self-backhaul link between the small cell and the macro base station, and wherein the apparatus determines the threshold comprises a sum of: 1) a number of all macro user devices served by a macro base station, and 2) a number of small cell user devices served by each of the plurality of small cells other than the first small cell.

17. The apparatus of claim 15 wherein the small cell comprises a first small cell, and wherein each of a plurality of small cells, including the first small cell, is served by the macro base station via a self-backhaul link between the small cell and the macro base station, and wherein the apparatus determines threshold comprises a sum of: 1) a number of all macro user devices served by a macro base station, and 2) a number of small cell user devices served by each of the plurality of small cells.

18. The apparatus of claim 14 wherein additionally causing the apparatus to determining that a threshold condition is exceeded comprises: determining that a sum of ratios of: 1) a data rate for the self-backhaul link for the small cell to 2) a data rate of an access link between the small cell and each of one or more small cell user devices served by the small cell, is greater than a threshold.

19. The apparatus of claim 14 wherein the decreasing comprises: decreasing, by the macro base station, based on the determining, the portion of downlink resources allocated to the self-backhaul link for the small cell which frees up some of the resources that were allocated to the small cell; determining, by the macro base station, a portion of the freed up resources to be re-allocated to at least one of: an access link for one or more macro user devices served by the macro base station; and a self-backhaul link for one or more other small cells served by the macro base station.

20. The apparatus of claim 14 wherein the small cell comprises a first small cell, and wherein the determining a portion of downlink resources allocated to a self-backhaul link for a small cell comprises: 1) determining a portion of downlink resources allocated to the self-backhaul link for the first small cell based on a ratio of: 1) a number of small cell user devices served by the small cell to 2) a sum of A) a number of macro user devices served by the macro base station and B) a number of small cell user devices served by a micro base station for one or more small cells, including the first small cell, that are served by or receive resources from the macro base station via a self-backhaul link, 2) receiving, by a macro base station from each of a plurality of small cells including the first small cell, a number of small cell user devices served by the small cell; determining a number of macro user devices served by the macro base station; and determining a portion of downlink resources allocated to a self-backhaul link for the first small cell based on the number of small cell user devices served by the first small cell, the number of small cell user devices served by all small cells that receive resources from the macro base stations, and the number of macro user devices served by the macro base station.

* * * * *